(12) United States Patent
Bobba et al.

(10) Patent No.: US 9,328,923 B2
(45) Date of Patent: May 3, 2016

(54) SYSTEM AND METHOD FOR SEPARATING FLUIDS

(71) Applicant: General Electric Company, Schenectady, NY (US)

(72) Inventors: Mohan Krishna Bobba, Simpsonville, SC (US); Roy Marshall Washam, Clinton, SC (US)

(73) Assignee: General Electric Company, Schenectady, NY (US)

( * ) Notice: Subject to any disclaimer, the term of this patent is extended or adjusted under 35 U.S.C. 154(b) by 712 days.

(21) Appl. No.: 13/649,090

(22) Filed: Oct. 10, 2012

(65) Prior Publication Data

US 2014/0099584 A1  Apr. 10, 2014

(51) Int. Cl.
*F23R 3/00* (2006.01)
*F23R 3/04* (2006.01)
*F23R 3/16* (2006.01)
*F23R 3/28* (2006.01)

(52) U.S. Cl.
CPC ................. *F23R 3/002* (2013.01); *F23R 3/045* (2013.01); *F23R 3/16* (2013.01); *F23R 3/283* (2013.01); *Y02T 50/675* (2013.01)

(58) Field of Classification Search
CPC . F23D 21/00; F23D 2200/00; F23D 2202/00; F23D 2203/00; F23D 2203/002; F23D 2203/005; F23D 2203/007; F23D 11/44; F23D 11/441; F23R 3/02; F23R 3/54; F23R 3/06; F01D 9/023; Y02T 50/675
See application file for complete search history.

(56) References Cited

U.S. PATENT DOCUMENTS

| | | | |
|---|---|---|---|
| 6,209,325 B1* | 4/2001 | Alkabie | 60/737 |
| 6,385,958 B2 | 5/2002 | Leone et al. | |
| 2004/0250547 A1* | 12/2004 | Mancini et al. | 60/740 |
| 2010/0037622 A1 | 2/2010 | Sima et al. | |
| 2010/0186416 A1 | 7/2010 | Chen et al. | |
| 2012/0060511 A1 | 3/2012 | Zuo et al. | |

* cited by examiner

*Primary Examiner* — Craig Kim
(74) *Attorney, Agent, or Firm* — Fletcher Yoder, P.C.

(57) ABSTRACT

A system includes a turbomachine including a first chamber configured to contain a first fluid and a second chamber configured to contain a second fluid. The turbomachine also includes a barrier disposed between the first and second chambers. The barrier is configured to separate the first fluid and the second fluid. Additionally, the barrier includes a first surface facing the first chamber and a second surface facing the second chamber. The turbomachine also includes an orifice extending from the first chamber to the second chamber. The orifice defines a fluid passageway. Additionally, the turbomachine includes a tube including a first end and a second end. The first end is coupled to the first surface and is disposed about a perimeter of the orifice. The tube is configured to at least partially contain the second fluid.

20 Claims, 4 Drawing Sheets

SYSTEM AND METHOD FOR SEPARATING FLUIDS

BACKGROUND OF THE INVENTION

The subject matter disclosed herein relates to turbomachine purging and more specifically to combustor purging.

A gas turbine engine combusts a mixture of compressed air and fuel within a combustion chamber of a turbine combustor to produce hot combustion gases, and then drives one or more turbines with the resulting hot combustion gases. Unfortunately, the hot combustion gases may accumulate in various passages and/or cavities of the combustor, which may cause undesirable wear to components of the combustor and may lead to combustion at undesired locations, also referred to as flame holding and/or flashback. Accordingly, a purge gas, such as cooling air, may be provided to these passages to remove the hot combustion gases or flammable fuel-air mixtures to reduce the occurrence of flashback and/or flame holding. However, even with purge flows, pressure fluctuations in the combustor may cause momentary or prolonged backflow of the combustion gases or fuel-air mixtures into the passages.

BRIEF DESCRIPTION OF THE INVENTION

Certain embodiments commensurate in scope with the originally claimed invention are summarized below. These embodiments are not intended to limit the scope of the claimed invention, but rather these embodiments are intended to only provide a brief summary of possible forms of the invention. Indeed, the invention may encompass a variety of forms that may be similar to or different from the embodiments set forth below.

In a first embodiment, a system includes a turbomachine including a first chamber configured to contain a first fluid and a second chamber configured to contain a second fluid. The turbomachine also includes a barrier disposed between the first and second chambers. The barrier is configured to separate the first fluid and the second fluid. Additionally, the barrier includes a first surface facing the first chamber and a second surface facing the second chamber. The turbomachine also includes an orifice extending from the first chamber to the second chamber. The orifice defines a fluid passageway. Additionally, the turbomachine includes a tube including a first end and a second end. The first end is coupled to the first surface and is disposed about a perimeter of the orifice. The tube is configured to at least partially contain the second fluid.

In a second embodiment, a method includes separating a first fluid and a second fluid with a barrier of a turbomachine. The barrier includes a first surface facing the first fluid and a second surface facing the second fluid. The method also includes enabling fluid passage through an orifice in the barrier and a tube extending from the first surface of the barrier. The method further includes containing the second fluid in the tube.

In a third embodiment, a system includes a combustor. The system also includes a first chamber disposed in the combustor and configured to flow a fuel. Additionally, the system includes a second chamber disposed adjacent to the first chamber and configured to receive a purge flow. The system further includes an orifice extending between the first and the second chambers. The orifice is configured to direct the purge flow from the second chamber to the first chamber. Additionally, the system includes a tube disposed about a perimeter of the orifice and coupled to the second chamber. The tube is configured to at least partially contain the fuel.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
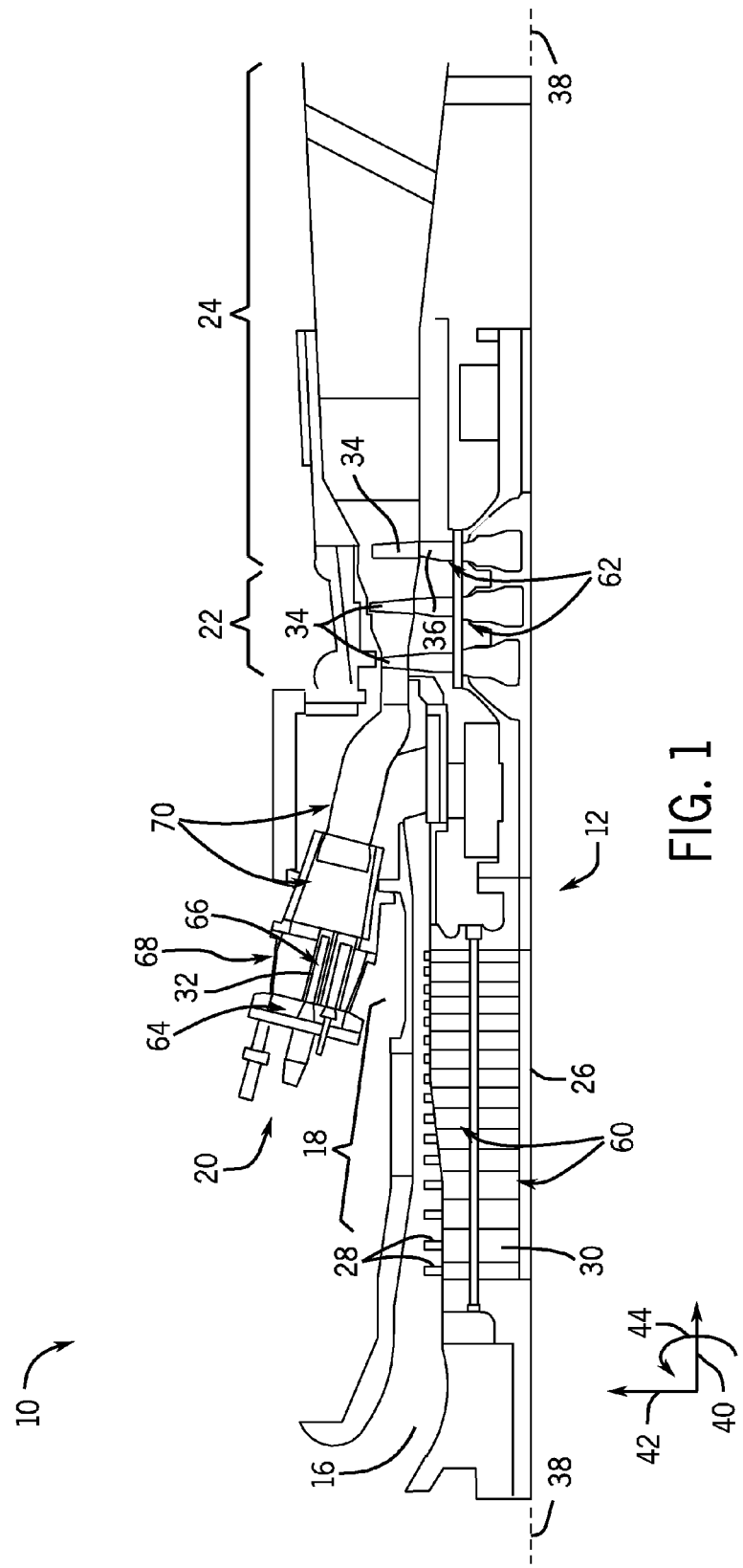
FIG. 1 is a cross-sectional side view of an embodiment of a gas turbine engine that may employ tube extensions in accordance with aspects of the present techniques.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A purge gas (e.g., air, nitrogen, other inert gas, steam, carbon dioxide, or exhaust gas) may be provided to various chambers in a combustor of a gas turbine engine to remove combustible mixtures of fuel and air from the chambers to reduce the occurrence of flame holding and/or flashback. Similarly, a purge gas may be provided to a chamber to remove hot combustion gases that may cause damage to components of the gas turbine engine. Additionally or alternatively, a purge flow may be provided to a chamber to reduce the amount of any undesirable fluids that enter the chamber. For example, possible purge scenarios in a gas turbine engine may include purges provided to liner cooling-holes, hot gas paths (e.g., through a turbine nozzle), fuel-injection ports, and cartridges (e.g., fuel nozzles).

However, pressure fluctuations in the combustor may stall the purge flow and may cause undesirable backflow of hot combustion gases into chambers of the combustor. More specifically, the pressure oscillations of the combustor may result in a momentary or prolonged increase in pressure of a region surrounding the chamber, which may cause the hot combustion gases or combustible fuel-air mixtures to flow into the chamber. While the hot combustion gases may backflow only momentarily (i.e., a small displacement into the chamber), the entire chamber may be purged to remove the combustion gases. Thus, it may be desirable to provide a method for reducing the backflow of undesirable fluids (e.g., combustion gases or combustible mixtures) into a chamber and for reducing the amount of purge gas used to purge the undesirable fluids from the chamber.

With the foregoing in mind, the disclosed embodiments include a tube extension disposed about a perimeter of an orifice to reduce backflow of a fluid through the orifice into a chamber. More specifically, the orifice may extend through a barrier separating a first fluid (e.g., air) contained in a first chamber and a second fluid (e.g., combustion gases) contained in a second chamber, and the orifice may define a fluid passageway between the first chamber and the second chamber. For example, the tube extension may be coupled to a surface of the barrier that faces the first chamber. Thus, if pressure oscillations occur and cause the combustion gases to backflow into the first chamber, the tube extension may at least partially contain the combustion gases and may separate the combustion gases from the air within the first chamber. Furthermore, the amount of purge gas used to purge the combustion gases from the first chamber may be reduced. That is, rather than purging the entire first chamber, only the tube extension may be purged if the displacement of the combustion gases into the first chamber is less than the length of the tube extension and the combustion gases are contained within the tube extension. It should be noted that while the present embodiments are discussed within the context of gas turbine engines with purge flows, they are also applicable to any turbo-machinery (e.g., compressor, turbine, pump, etc.) having similar purge flows where the back-flow of an undesired fluid into a volume may need to be limited. For example, the present embodiments are also applicable to steam turbines, wind turbines, combustion engines (e.g., spark ignition internal combustion engines, compression ignition engines such as diesel engines, etc.), various combustion systems and reactors (e.g., gasifiers, boilers, furnaces, etc.) and the like.

Turning now to the drawings, FIG. 1 illustrates an embodiment of a system 10 including a gas turbine engine 12, which may employ tube extensions in various passages and/or chambers of the gas turbine engine 12, which will be described in more detail below. In certain embodiments, the system 10 may include an aircraft, a watercraft, a locomotive, a power generation system, or combinations thereof. The illustrated gas turbine engine 12 includes an air intake section 16, a compressor 18, a combustor section 20, a turbine 22, and an exhaust section 24. The turbine 22 is coupled to the compressor 18 via a shaft 26.

Air may enter the gas turbine engine 12 through the air intake section 16 and flow into the compressor 18, which compresses the air prior to entry into the combustor section 20. In particular, the compressor 18 includes compressor blades 28 that are coupled to compressor rotor disks 30. As the compressor disks 30 rotate during operation, the compressor blades 28 rotate and compress air from the air intake 16 into pressurized air. The pressurized air may then be routed to the combustor section 20, which may include one or more fuel nozzles 32. The fuel nozzles 32 may mix the pressurized air with fuel to produce a suitable fuel-air mixture, which combusts in the combustion section 20 to generate hot combustion gases to drive the turbine 22. For example, the combustion gases may apply motive forces to turbine blades 34, which are coupled to turbine rotor disks 36, to drive the turbine 22 into rotation, which causes the shaft 26 to rotate about a rotational axis 38. The combustion gases may then exit the gas turbine engine 12 via the exhaust section 24. Furthermore, the shaft 26 may be coupled to a load, which may be powered via rotation of the shaft 26. By way of example, the load may be any suitable device that may generate power via the rotational output of the gas turbine engine 12, such as a power generation plant or an external mechanical load. For instance, the load may include an electrical generator, a propeller of an airplane, and so forth. In the following discussion, reference may be made to various directions, such as an axial direction or axis 40, a radial direction or axis 42, and a circumferential direction or axis 44. The axial direction 40 is generally oriented along the rotational axis 38.

As noted above, the gas turbine engine 12 may employ tube extensions in various passages and/or chambers. Specifically, the tube extensions may be suitable for any passage and/or chamber that may receive a purge flow. As described above, the tube extensions may improve a backflow margin by reducing the backflow of an undesirable fluid (e.g., hot air, hot combustion gases, and/or fuel mixtures) into the passage or chamber, which may occur as a result of pressure and/or temperature fluctuations. In certain embodiments, a cooling purge gas may be provided to components of the gas turbine engine 12 that experience high temperatures during operation to dissipate heat. For example, a purge may be provided to the compressor 18 and may be directed around one or more of the compressor rotor disks 30. Accordingly, tube extensions may be utilized along the purge flow path, as illustrated by arrows 60. Additionally, a purge may be provided to components of the turbine 22 that may reach high temperatures due to the hot combustion gases. Thus, tube extensions may be positioned around the turbine blades 34 and turbine rotor disks 36, as illustrated by arrows 62.

The tube extensions may be particularly suited for purge scenarios within the combustor section 20, as the combustion section 20 may experience pressure fluctuations, which may result from changes in the composition or properties of the fuel supplied to the fuel nozzles 32, combustion dynamics, or the like. Fuel-injection ports, which inject fuel during normal operation of the gas turbine engine 12, may be purged following shut-down of the gas turbine engine 12 to remove any residual fuel in the fuel-injection ports, which may form undesirable residues in the fuel-injection ports if exposed to heat. Accordingly, tube extensions may be positioned along the purge flow path for the fuel-injection ports, as generally illustrated by arrow 64. Similar to the fuel-injection ports, it may be desirable to purge the fuel nozzles 32 (e.g., cartridges) to remove any remaining fuel when fuel is not actively flowing through the fuel nozzles 32 and to utilize tube extensions, as illustrated by arrow 66, to reduce the backflow of fuel into the fuel nozzles 32. Additionally, cooling purge air may be provided to heat shields and/or combustor liners to create a thermally isolating barrier between the outer side walls of the combustor section 20 and the hot combustion gases. Thus, to reduce backflow of the hot combustion gases into these cavities, tube extensions may be placed along the heat shields and combustor liners, as illustrated by arrows 68 and 70, respectively.

Figure 2:
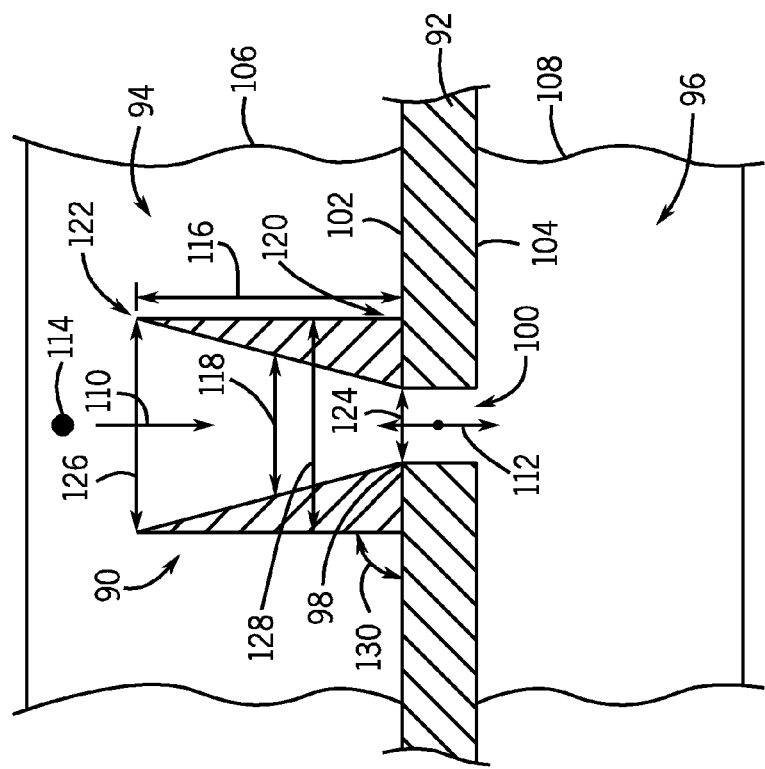
FIG. 2 is a cross-sectional side view of an embodiment of one of the tube extensions of FIG. 1.

With the foregoing in mind, FIG. 2 illustrates a cross-sectional view of an embodiment of a tube extension 90 (e.g., a tube), which may be positioned along a flow path of a purge provided to hot gas paths, fuel-injection ports, fuel nozzles, heat shields, combustor liners, and the like. In particular, the tube extension 90 may be coupled to a barrier 92 that separates a first fluid 94 from a second fluid 96 and may be disposed around a perimeter 98 of an orifice 100 that extends through the barrier 92. The orifice 100 defines a fluid passageway between the first and the second fluids 94 and 96. As illustrated, the tube extension 90 is coupled to a first surface 102 of the barrier 92 that faces the first fluid 94. Alternatively, the tube extension 90 may be coupled to a second surface 104 of the barrier 92 that faces the second fluid 96. In certain embodiments, the first and the second fluids 94 and 96 may be contained by first and second chambers 106 and 108, respectively. In one embodiment, the first and second chambers 106 and 108 may flow the first and the second fluids 94 and 96, respectively. Further, in certain embodiments, the first and second chambers 106 and 108 may not have definite boundaries, but instead, may be defined by voids between neighboring components. In certain embodiments, the first or the second chamber 106 and 108 may include the barrier 92.

As the orifice 100 defines a fluid passageway, the first and the second fluids 94 and 96 may flow through the orifice 100 into the opposing chamber. In certain embodiments, it may be desirable to reduce the amount of the second fluid 96 in the first chamber 106. For example, the second fluid 96 may be a hot combustion gas, fuel, or a fuel-air mixture. Additionally or alternatively, the first chamber 106 may be a cavity that may experience damage if exposed to fuel or hot gases and/or the first chamber 106 may thermally isolate one or more neighboring components and thus, may be kept to a suitable temperature to provide sufficient thermal isolation. Accordingly, it may be desirable to reduce the amount of hot gases or fuel within the first chamber 106. Thus, a purge flow or a purge passage (e.g., air, nitrogen, other inert gas, steam, carbon dioxide, exhaust gas, or a combination thereof), represented by arrow 110, may be provided to the first chamber 106 to remove the second fluid 96 from the first chamber 106. The orifice 100 may direct the purge flow 110 from the first chamber 106 to the second chamber 108. Accordingly, pressure-drop across the purge passage 110 may be selected to achieve a desired backflow margin. That is, the pressure of the purge flow 110 may be selected such that the difference between the pressure of the first fluid 94 (i.e., the pressure of the first chamber 106) and the pressure of the second fluid 96 (i.e., the pressure of the second chamber 108) is positive. Higher backflow margin implies a reduction in the amount of backflow of the second fluid 96 into the first chamber 106. In certain embodiments, the first fluid 94 may be the purge gas. Alternatively, the first chamber 106 may contain both the first fluid 94 and the purge gas.

As noted above, pressure fluctuations, illustrated by double arrow 112, within the first and/or the second chambers 106 and 108 may occur, which may stall the purge flow 100 and may reverse the flow direction, such that the second fluid 96 flows into the first chamber 106. That is, the pressure of the second fluid 96 and/or the pressure of the second chamber 108 may periodically increase to a pressure that is higher than the pressure of the first fluid 94 and/or the pressure of the first chamber 106. In certain embodiments, the pressure of the second fluid 96 and/or the pressure of the second chamber 108 may oscillate. Typically, if the second fluid 96 enters the first chamber 106, the entire first chamber 106 may be purged to remove the second fluid 96. However, as the tube extension 90 may at least partially contain the second fluid 96 if pressure fluctuations 112 cause the second fluid 96 to backflow, only the tube extension 90 may need to be purged with the purge flow 100, rather than the entire first chamber 106. This may reduce the quantity of the purge flow 100 used, as compared to the quantity of the purge flow 110 that would be used to purge the entire first chamber 106, by approximately 30 to 100 percent, 50 to 95 percent, or 70 to 90 percent. Additionally, this may improve the backflow margin (i.e., increase the backflow margin or decrease the backflow of the second fluid 96 into the first chamber 106) by approximately 10 to 100 percent, 30 to 70 percent, or 40 to 60 percent. Alternatively, in certain embodiments, a source 114 for the purge flow 112 may be located near the tube extension 90 such that the purge flow 112 is provided directly to the tube extension 90. In this manner, the volume that is purged may be reduced and thus, the amount of purge flow 112 utilized may also be reduced. In certain embodiments, the source 114 may be compressor bleed air.

To maximize the amount of the second fluid 96 that is contained within the tube extension 90, a length 116 of the tube extension 90 may be selected based upon expected pressure fluctuations 112. The frequency and the peak-to-peak dynamics of the pressure fluctuations 112 affect the displacement (e.g., of backflow) of the second fluid 96 into the first chamber 106. Thus, the length 116 of the tube extension 90 may be selected for a maximum potential displacement. Furthermore, in certain embodiments, the tube extension 90 may act as a diffuser to reduce the velocity of the second fluid 96 into the first chamber 106. By reducing the velocity of the second fluid 96, the length 116 of the tube extension 90 may be reduced.

As illustrated, the tube extension 90 may be tapered, e.g., conical. For example, the tube extension 90 may have an inner diameter 118 that linearly or curvilinearly increases along the length 116 of the tube extension from a first end 120 to a second end 122 of the tube extension 90. Thus, the tube extension 90 may have a first inner diameter 124 at the first end 120 and a second inner diameter 126 at the second end, and the first inner diameter 124 may be less than the second inner diameter 126. In certain embodiments, a ratio of the second inner diameter 126 to the first inner diameter 124 may be between approximately 4:1 to 1.1:1, 3:1 to 1.25:1, or 2:1 to 1.5:1. In other embodiments, the change in the diameter of the tube extension 90 may not be gradual (e.g., step-wise, or not tapered). Furthermore, while FIG. 2 illustrates the tube extension 90 as having an outer diameter 128 that is constant along the length 116, in other embodiments, the outer diameter 128 may vary. For example, the outer diameter 128 may decrease along the length 116 from the first end 120 to the second end 122 to support the tube extension 90 and to better secure the tube extension 90 to the barrier 92.

The tube extension 90 may be shaped with any suitable cross-section. For example, the cross-section of the tube extension 90 may be a circle, an oval, a triangle, a square, a rectangle, a polygon, and the like. Additionally, the tube extension 90 may be formed with the cross-section varying along the length 116, such that no flow separation extends to the displaced flow-interface. Furthermore, while tube extension 90 is illustrated as a straight tube extension 90 that is perpendicular to the barrier 92, the tube extension 90 may be secured to the barrier 92 at any suitable angle 130 (e.g., 10 to 90, 15 to 80, 20 to 70, 30 to 60, or 40 to 50 degrees) and may be partially or entirely curved, as illustrated by the dashed lines 117, along the length 116 to accommodate the geometry of the gas turbine engine 12.

Figure 3:
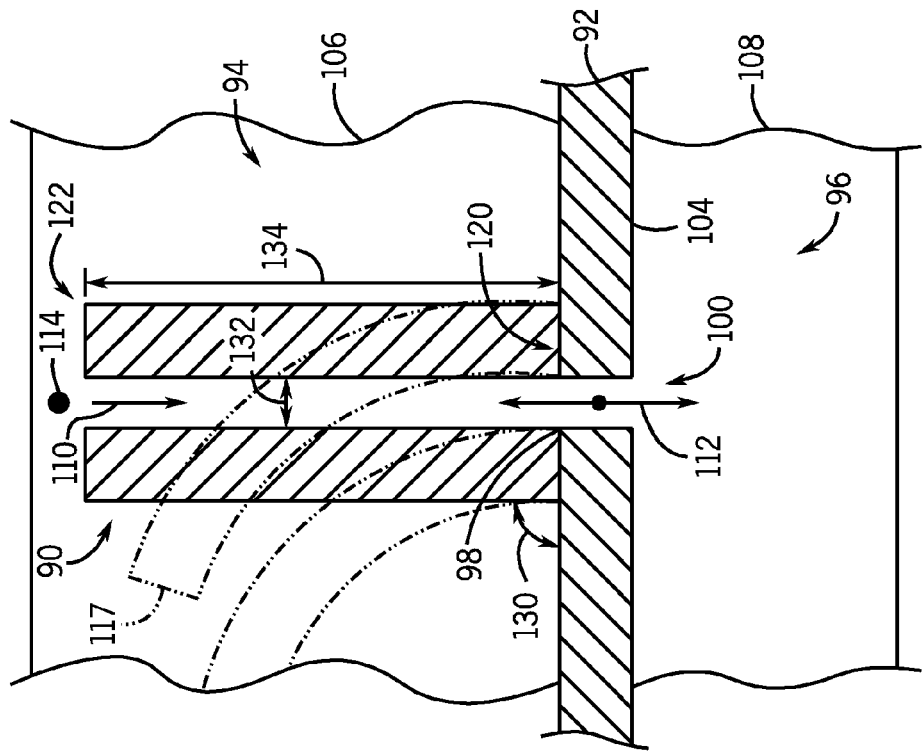
FIG. 3 is a cross-sectional side view of an embodiment of one of the tube extensions of FIG. 1.

In other embodiments, the tube extension 90 may have a constant inner diameter 132, as illustrated in FIG. 3. However, as the tube extension 90 with the constant inner diameter 132 may not slow the backflow of the second fluid 96, it may be desirable to provide the tube extension 90 with a longer length 134. In certain embodiments, a ratio of the length 134 to the inner diameter 132 may be approximately 5:1 to 1.1:1, 4:1 to 1.25:1, 3:1 to 1.5:1, or 2:1 to 1.75:1. Other elements in FIG. 3 in common with those shown in FIG. 2 are labeled with the same reference numerals.

As the second fluid 96 may be a hot combustion gas, fuel, or a fuel-air mixture, the tube extension 90 may be formed of any suitable materials that may withstand high temperatures and/or may be exposed to fuel. For example, the tube extension 90 may be formed of refractory materials, refractory metals, non-metallic materials, ceramics, ceramic matrix composites, and any combination thereof. Additionally, the bather 92 and/or the second chamber 108 may be formed of refractory materials, refractory metals, non-metallic materials, ceramics, ceramic matrix composites, and any combination thereof. In certain embodiments, the tube extension 90 may be constructed from the same material as the barrier 92 and/or the second chamber 108. For example, the tube extension 90 may be formed from or out of the barrier 92 (i.e., an integral part of the barrier 92).

Figure 4:
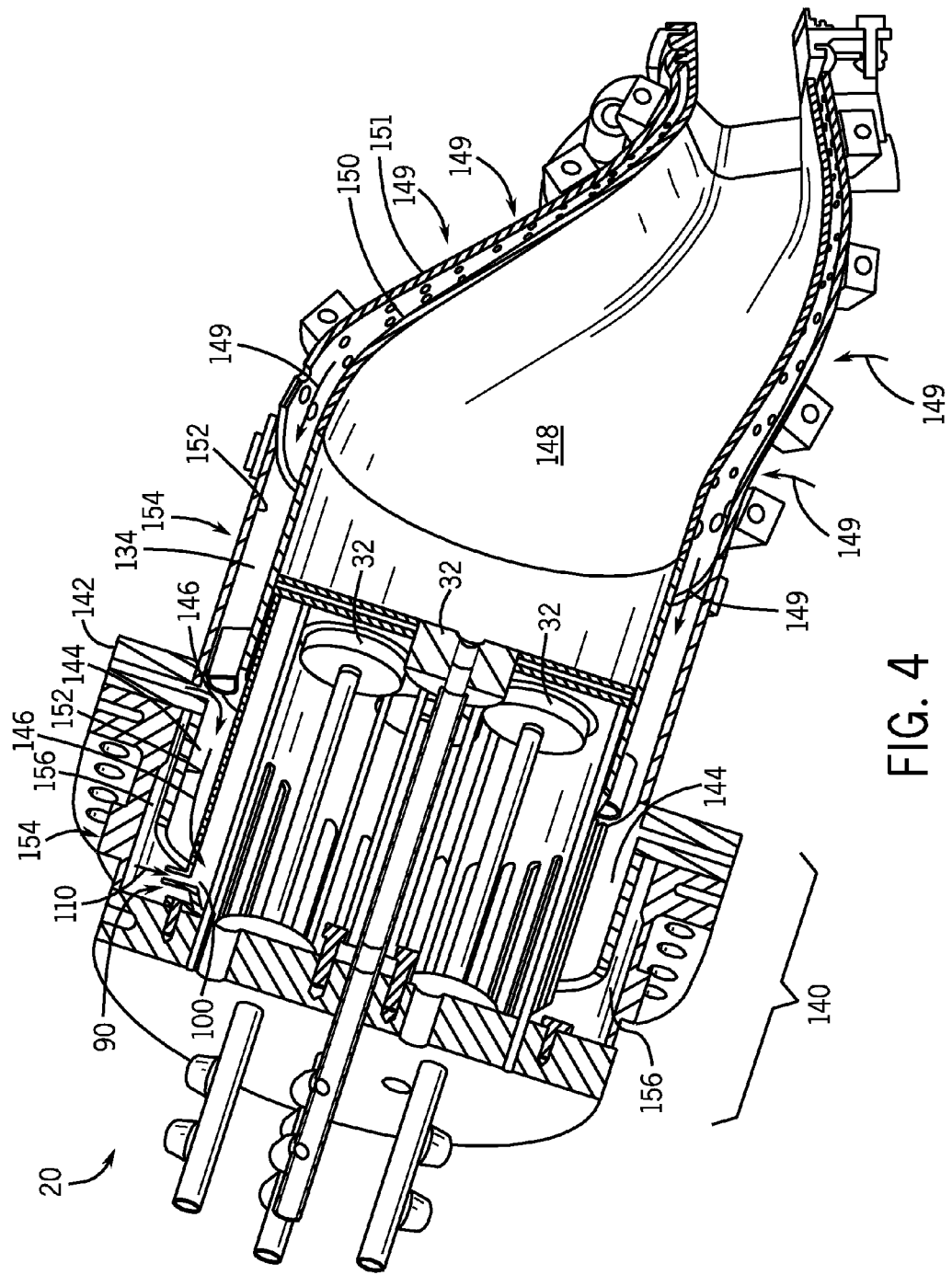
FIG. 4 is a perspective cutaway view of an embodiment of a combustor section of the gas turbine engine of FIG. 1, illustrating an embodiment of one of the tube extensions of FIG. 1 that may direct a purge flow from a heat shield into a chamber.

As described above, it may be desirable to provide one or more tube extensions 90 along a purge flow 110 that provides cooling air to heat shields of the combustor section 20. For example, FIG. 4 illustrates a cutaway perspective view of the combustor section 20 including one or more fuel nozzles 32, which may be arranged in an end cap 140. As noted above, the fuel nozzles 32 combine fuel and pressurized air to form a fuel-air mixture. In the illustrated embodiment, the fuel nozzles 32 receive the fuel from one or more quaternary fuel injectors 142, which inject fuel into an airflow 149 from the compressor 18. For example, the airflow 149 may enter an annular chamber 144 between a combustor liner 150 and a perforated flow sleeve 151. The fuel and pressurized air may flow through the annular chamber 144 toward the end cap 140, as illustrated by arrows 146, to pass through the fuel nozzles 32. The fuel-air mixture may then flow to a combustion chamber 148, which is surrounded by the combustor liner 150, downstream of the end cap 140. The fuel-air mixture is ignited and combusted to form hot combustion gases (e.g., exhaust).

Accordingly, the hot combustion gases may increase the temperature of the combustor section 20, and thus, cooling air may be provided to various components of the combustor section 20, such as one or more external walls 152 of a casing 154. Furthermore, in certain embodiments, one or more heat shields 156 (e.g., heat shield regions) may be provided between the external walls 152 and chambers containing hot combustions gases and/or fuel. For example, the heat shield 156 may be adjacent to the external wall 152 and/or may be disposed between the external wall 152 and the annular chamber 144, which may contain and/or flow a fuel or a fuel-air mixture. Additionally or alternatively, the heat shield 156 may be disposed between the external wall 152 and the combustion chamber 148, which may contain hot combustion gases. In certain embodiments, the heat shields 156 may be annular chambers. Generally, the heat shields 156 are chambers that contain and/or flow a cooling fluid (e.g., air) to provide a thermally isolating barrier between the external wall 152 and a chamber containing hot combustions gases and/or fuel. Additionally, it may be desirable to continuously or periodically purge (e.g., via the purge flow 110) the heat shield 156 to maintain a desired temperature inside the heat shield 156. In certain embodiments, the purge flow 110 may flow through the heat shield 156 to remove any hot combustion gases and/or fuel that may enter the heat shield 156.

However, as noted above, pressure fluctuations in the combustor section 20 may occur (e.g., due to combustion dynamics), which may periodically stall the purge flow 110 through the heat shield 156. Thus, the tube extension 90 may be provided around an orifice 100 of the purge flow 110 path. In this illustrated embodiment, the tube extension 90 is provided to the heat shield 156 that extends at least partially between the external wall 152 and the annular chamber 144 containing a fuel-air mixture. In this manner, the purge flow 110 may provide the first fluid (e.g., cooling air) through the tube extension 90. In the event that pressure oscillations of the combustor section 20 cause a negative pressure differential between the pressure of the annular chamber 144 and the pressure of the heat shield 156, the tube extension 90 may at least partially contain the fuel-air mixture that may backflow into the heat shield 156.

Figure 5:
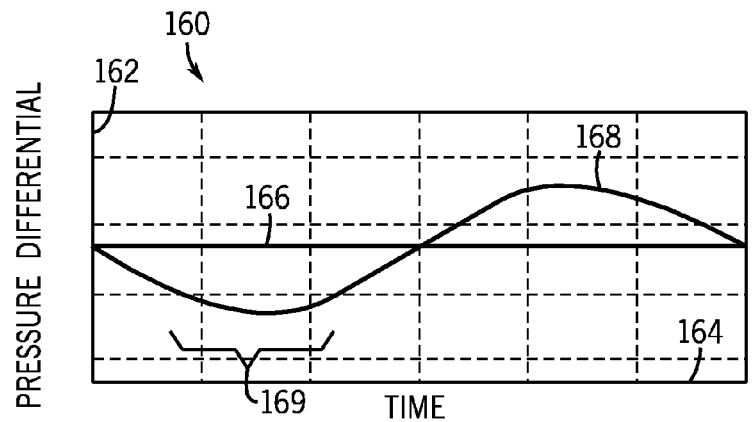
FIG. 5 is a graph illustrating an embodiment of a pressure differential between the heat shield and the chamber of FIG. 4.

Furthermore, as noted above, the length of the tube extension 90 may be selected based upon the expected pressure fluctuations 112. For example, FIG. 5 is a graph 160 modeling pressure fluctuations that may occur in the combustor section 20, or more specifically, in the annular chamber 144. The graph 160 illustrates a pressure differential (ordinate 162) against time (abscissa 164). More specifically, the pressure differential may be the pressure difference between the heat shield 156 (e.g., the first chamber 106) and the annular chamber 144 (e.g., the second chamber 108). A line 166 may be representative of a baseline pressure differential between the heat shield 166 and the annular chamber 144 in the absence of pressure fluctuations 112, while a line 168 may be representative of one possible pressure differential between the heat shield 166 and the annular chamber 144 that is at least partially caused by the pressure fluctuations 112. The pressure differential 168 illustrates that the pressure between the heat shield 166 and the annular chamber 144 may oscillate between positive and negative pressures. Indeed, the pressure differential 168 may be negative for a period 169.

Figure 6:
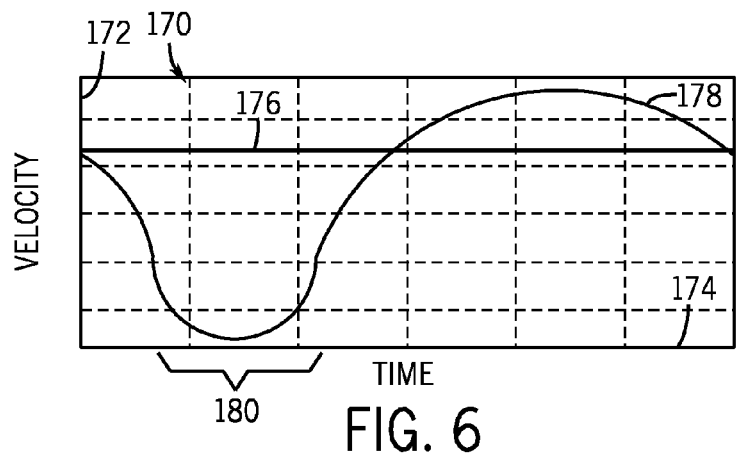
FIG. 6 is a graph illustrating an embodiment of a velocity of the purge flow of FIG. 4 that may result from the pressure differential of FIG. 5.

The pressure differential between the heat shield 156 and the annular chamber 144 may affect the velocity of the purge flow 110. For example, the pressure differential illustrated by line 168 may cause a change in velocity of the purge flow 110 as illustrated by graph 170 of FIG. 6. The graph 170 illustrates velocity (ordinate 172) against time (abscissa 174). A line 176 may be representative of a baseline velocity of the purge flow 110 from the heat shield 156 and the annular chamber 144 in the absence of pressure fluctuations 112, while a line 178 may be representative of the velocity of the purge flow 110 from the heat shield 156 into the annular chamber 144 resulting from the pressure differential 168. The velocity 178 may range between positive and negative velocities. As illustrated, the velocity 178 decreases and increases in conjunction with the pressure differential 168. Furthermore, in the illustrated embodiment, the velocity 178 may be negative during a period 180 that corresponds to the period 160 in which the pressure differential 168 is negative. In one embodiment, the velocity 178 may decrease but remain positive. Furthermore, it should be noted that as the pressure differential 168 may continue to oscillate, the velocity 178 may similarly oscillate.

Figure 7:
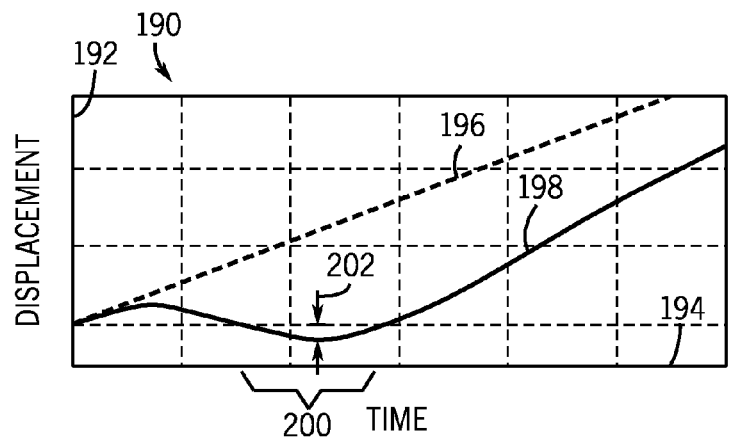
FIG. 7 is a graph illustrating an embodiment of a displacement of the purge flow of FIG. 4 that may result from the purge flow velocity of FIG. 6.

As the velocity of the purge flow 110 changes, the displacement of the purge flow 110 into the annular chamber 144 may also change. For example, FIG. 7 illustrates a graph 190 modeling the displacement of the purge flow 110 that may occur as a result of the pressure differential 168 and the velocity 178. The graph 190 illustrates displacement (ordinate 192) against time (abscissa 194). More specifically, the displacement 192 may be the displacement of the purge flow 110 from the heat shield 156 into the annular chamber 144. A line 196 may be representative of a baseline displacement of the purge flow 110 from the heat shield 156 into the annular chamber 144 in the absence of pressure fluctuations 112, while a line 198 may be representative of the displacement of the purge flow 110 resulting from the pressure differential 168 and the velocity 178. As illustrated, the baseline displacement 196 is positive and increases at a constant rate. However, due to a negative velocity 178, the displacement 198 may be negative for a period 200. The period 200 of negative displacement may cause the purge flow 110 and the fuel-air mixture from the annular chamber 144 to flow into the heat shield 156. In the illustrated embodiment, the purge flow 110 experiences a negative displacement 202. In certain embodiments, the negative displacement 202 may be between approximately 1 centimeter and 10 centimeters, 2 centimeters and 8 centimeters, or 3 centimeters and 6 centimeters, although other ranges are possible. Thus, for tube extensions 90 that are disposed about an orifice 100 defining a fluid passageway between the heat shield 156 and the annular chamber 144, the length 116 or 134 may be between approximately 1 centimeter and 10 centimeters, 2 centimeters and 8 centimeters, or 3 centimeters and 6 centimeters. Thus, the tube extension 90 may contain any undesired fluid, such as the fuel or the fuel-air mixture contained by the annular chamber 144, because the length 116 or 134 may be selected for an expected negative displacement 202, based upon the expected pressure differential 168. Furthermore, it may be desirable to increase the length 116 or 134 to accommodate any unexpected fluctuations. For example, the length 116 or 134 may be between approximately 3 centimeters and 12 centimeters, 4 centimeters and 10 centimeters, or 5 centimeters and 8 centimeters. In addition to the magnitude of pressure and velocity fluctuations discussed above, the frequency of these fluctuations may also affect back-flow margin. At different frequencies the time available for undesired fluid to travel through the tube extension 90 is different. This may require different length of tube extension 90 for specific applications.

As described above, certain embodiments include tube extensions 90 that may reduce the backflow of a fluid (e.g., the second fluid 96, the fuel-air mixture, and/or hot gases) into a chamber (e.g., the first chamber 106 and/or the heat shields 156), which may occur as a result of pressure fluctuations. The tube extensions 90 may at least partially contain the fluid and may separate the fluid from any fluids contained in the chamber (e.g., air). Furthermore, only the tube extensions 90 may be purged if the fluid enters the tube extension 90, rather than purging the entire chamber. Thus, the amount of purge flow 110 used may be reduced. For example, the amount of the purge flow 110 may be reduced by approximately 10 to 100 percent, 30 to 95 percent, or 50 to 90 percent. Additionally, as noted above, the tube extensions 90 may be suitable for any passage and/or chamber that may receive the purge flow 110. For example, the tube extension 90 may be positioned along a purge flow 110 provided to hot gas paths, fuel-injection ports, fuel nozzles, heat shields, combustor liners, and the like.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a turbomachine, comprising:
a combustion chamber;
a first chamber configured to contain a first fluid;
a second chamber configured to contain a second fluid;
a barrier disposed between the first and second chambers, wherein the barrier is configured to separate the first fluid and the second fluid, wherein the barrier comprises a first surface facing the first chamber and a second surface facing the second chamber;
an orifice extending from the first chamber to the second chamber and defining a fluid passageway; and
a tube comprising a first end and a second end, wherein the first end is coupled to the first surface and disposed about a perimeter of the orifice, wherein the tube is configured to at least partially contain the second fluid, and wherein the first chamber, the second chamber, and the tube are upstream of the combustion chamber of the turbomachine, wherein at least the first end of the tube is crosswise to the barrier, and the tube protrudes from the barrier in a direction against a purge flow through the tube.

2. The system of claim 1, wherein the tube comprises a first inner diameter at the first end and a second inner diameter at the second end, and wherein the second inner diameter is greater than the first inner diameter.

3. The system of claim 1, wherein an inner diameter of the tube progressively increases along a length of the tube from the first end to the second end.

4. The system of claim 1, wherein an inner diameter of the tube is constant along a length of the tube from the first end to the second end, and wherein a ratio of the inner diameter to the length is greater than approximately 2:1.

5. The system of claim 1, wherein the first chamber comprises a heat shield region disposed adjacent to the second chamber, wherein the second fluid comprise a fuel-air mixture, and wherein tube reduces a backflow of the fuel-air mixture into the heat shield region.

6. The system of claim 1, wherein the orifice comprises a liner cooling hole, an orifice along a hot gas path, a fuel injection port hole, or a fuel nozzle hole.

7. A method, comprising:
separating a first fluid disposed in a first chamber and a second fluid disposed in a second chamber with a barrier of a turbomachine, wherein the barrier comprises a first surface facing the first fluid and a second surface facing the second fluid, the first fluid comprises a purge flow, and the second fluid comprises a hot gas or a fuel;
enabling fluid passage from the first chamber to the second chamber through an orifice in the barrier and a tube extending from the first surface of the barrier; and
containing the second fluid in the tube, wherein a backflow margin is increased by containing the second fluid in the tube;
wherein the first chamber, the second chamber, and the tube are disposed upstream of a combustion chamber of the turbomachine.

8. The method of claim 7, comprising supplying the first fluid at a first pressure; and
supplying the second fluid at a second pressure, wherein the first pressure is less than the second pressure.

9. The method of claim 8, comprising oscillating the first pressure or the second pressure due to operation of the turbomachine.

10. The method of claim 7, wherein the orifice comprises a liner cooling hole or an orifice along a hot gas path.

11. A system, comprising:
a combustor comprising a combustion chamber;
a first chamber disposed in the combustor and configured to flow a fuel;
a second chamber disposed adjacent to the first chamber and configured to receive a purge flow;
an orifice extending through a barrier disposed between the first chamber and the second chamber, wherein the orifice is configured to direct the purge flow from the second chamber to the first chamber; and
a tube disposed about a perimeter of the orifice and coupled to the barrier, wherein the tube is configured to at least partially contain the fuel, and wherein the first chamber, the second chamber, and the tube are disposed upstream of the combustion chamber, and the tube extends radially from the barrier into the second chamber.

12. The system of claim 11, wherein the second chamber comprises a heat shield, and wherein the heat shield is disposed between the first chamber and an external wall of the combustor.

13. The system of claim 11, wherein the tube comprises a first end and a second end, wherein the first end is coupled to the barrier, and wherein a diameter of the tube increases along a length of the tube from the first end to the second end.

14. The system of claim 13, wherein the length of the tube is between approximately 2 and 6 centimeters.

15. The system of claim 11, wherein the tube is at least partially curved.

16. The system of claim 1, wherein the first chamber, the second chamber, and the tube are upstream of a fuel nozzle of the turbomachine.

17. The system of claim 1, wherein the first chamber, the second chamber, and the tube are separate from a fuel nozzle of the turbomachine.

18. The system of claim 1, wherein the purge flow is configured to flow through the orifice from the first chamber to the second chamber, and wherein the tube protrudes from the barrier into the first chamber.

19. The system of claim 1, wherein the first and second chambers are annular chambers, and wherein the first chamber is disposed about the second chamber.

20. The system of claim 11, wherein the first and second chambers are annular chambers, and wherein the second chamber is disposed about the first chamber.

* * * * *